US012775753B2

(12) United States Patent
Foote

(10) Patent No.: US 12,775,753 B2
(45) Date of Patent: Oct. 27, 2026

(54) GENERATING COIL GEOMETRIES FOR WIRELESS POWER TRANSFER SYSTEM

(71) Applicant: VOLKSWAGEN AKTIENGESELLSCHAFT, Wolfsburg (DE)

(72) Inventor: Andrew Foote, Knoxville, TN (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 1044 days.

(21) Appl. No.: 17/061,067

(22) Filed: Oct. 1, 2020

(65) Prior Publication Data

US 2022/0108048 A1 Apr. 7, 2022

(51) Int. Cl.

| | |
|---|---|
| ***G06F 30/20*** | (2020.01) |
| ***B60L 53/12*** | (2019.01) |
| ***G06F 30/15*** | (2020.01) |
| ***G06F 30/23*** | (2020.01) |
| ***G06F 30/36*** | (2020.01) |
| ***G06F 111/10*** | (2020.01) |
| ***G06F 119/06*** | (2020.01) |
| *H01F 38/14* | (2006.01) |
| *H02J 50/10* | (2016.01) |
| *H02J 105/37* | (2026.01) |

(52) U.S. Cl.

CPC .............. *G06F 30/20* (2020.01); *B60L 53/12* (2019.02); *G06F 30/15* (2020.01); *G06F 30/36* (2020.01); *G06F 30/23* (2020.01); *G06F 2111/10* (2020.01); *G06F 2119/06* (2020.01); *H01F 38/14* (2013.01); *H02J 50/10* (2016.02); *H02J 2105/37* (2026.01)

(58) Field of Classification Search

CPC .......... G06F 30/20; G06F 30/15; G06F 30/36; G06F 30/23; G06F 2111/10; G06F 2119/06; B60L 53/12; H01F 38/14; H02J 50/10; H02J 2310/48

USPC .............................................................. 703/2

See application file for complete search history.

(56) References Cited

U.S. PATENT DOCUMENTS

| | | | | |
|---|---|---|---|---|
| 10,014,104 | B2 * | 7/2018 | Widmer | H02J 7/00034 |
| 2002/0057087 | A1 * | 5/2002 | Crozier | G01R 33/34046 324/309 |

OTHER PUBLICATIONS

Haga, Nozomi, and Masaharu Takahashi. "Analysis of a wireless power transfer system by the impedance expansion method using Fourier basis functions." IEICE Transactions on Communications 101.7 (2018). pp. 1708-1715. (Year: 2018).*

Poole, Michael, et al. "Minimax current density coil design." Journal of Physics D: Applied Physics 43.9 (2010). pp. 1-13. (Year: 2010).*

Saito, Naoki, and Ronald R. Coifman. "Local discriminant bases and their applications." Journal of Mathematical Imaging and Vision 5 (1995): 337-358. (Year: 1995).*

(Continued)

*Primary Examiner* — John E Johansen

(57) ABSTRACT

In one embodiment, a method of generating one or more coil geometries is provided. The method includes obtaining a set of input parameters to be used in conjunction with a set of basis functions. The method also includes performing an analysis of a set of coefficients of the set of basis functions based on the set of input parameters. The method further includes determining one or more coil geometries based on the analysis of the set of coefficients of the set of basis functions.

19 Claims, 6 Drawing Sheets

(56) References Cited

OTHER PUBLICATIONS

Ji, Zhong, et al. "A stable solution of time domain electric field integral equation for thin-wire antennas using the Laguerre polynomials." IEEE transactions on antennas and propagation 52.10 (2004): 2641-2649. (Year: 2004).*

Svendsen, Guro K., Magnus W. Haakestad, and Johannes Skaar. "Reciprocity and the scattering matrix of waveguide modes." Physical Review A—Atomic, Molecular, and Optical Physics 87.1 (2013): 013838. (Year: 2013).*

Luo, Zhichao, and Xuezhe Wei. "Analysis of square and circular planar spiral coils in wireless power transfer system for electric vehicles." IEEE Transactions on Industrial Electronics 65.1 (2017): 331-341. (Year: 2017).*

Smeets, J. P. C., et al. "Three-dimensional analytical modeling technique of electromagnetic fields of air-cored coils surrounded by different ferromagnetic boundaries." IEEE transactions on magnetics 49.12 (2013): 5698-5708. (Year: 2013).*

* cited by examiner

GENERATING COIL GEOMETRIES FOR WIRELESS POWER TRANSFER SYSTEM

TECHNICAL FIELD

Embodiments of the present disclosure relate generally to wireless power transfer systems. More particularly, embodiments of the disclosure relate to methods and systems for generating one or more coil geometries for wireless power transfer systems.

BACKGROUND

Wireless power transfer systems may allow the transmission of electrical energy (e.g., power) to a device without using wires or a physical link. A wireless power transfer system may provide power to a device via inductive coupling (e.g., electromagnetic induction, inductive power transfer (IPT), etc.). The wireless power transfer system may include a primary coil and the device may include a secondary coil. An alternating current (AC) passed through the primary coil creates an oscillating magnetic field. The magnetic field passes through the secondary coil, where it induces an alternating electromagnetic force that creates an alternating current. Wireless power transfer systems may be used to charge various types of devices, such as electronic devices, computing devices, smart phones, laptop computers, tablet computers, batteries, vehicles, etc.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As discussed above, a wireless power transfer system may use coils to transmit power. Determining the shape/geometry of the coils may be a difficult, time consuming, and/or computationally expensive process. For example, a finite element analysis (FEA) may be used to identify coil shapes/geometries that may be used. However, attempting to consider all possible coil geometries (as well as other input/design parameters such as operating frequency, number of turns, and conductor types) when performing the FEA may result in a large number of possibilities. Performing the FEA simulation of these large number of possibilities may be near impossible. In addition, FEA is often a manual, time consuming, computationally expensive, and difficult process.

Thus, a faster, more efficient, and/or less computationally expensive method for determining coil shapes/geometries (that satisfy various input parameters) may be very useful. In one embodiment, the magnetic fields are first designed to optimize performance through variation of Fourier basis function coefficients. The computed fields are then discretized into winding geometries, without constraint on winding shape. This allows for the quicker and/or faster computation of the coil geometry/shape, coil inductances, currents, and magnetic fields.

Figure 1:
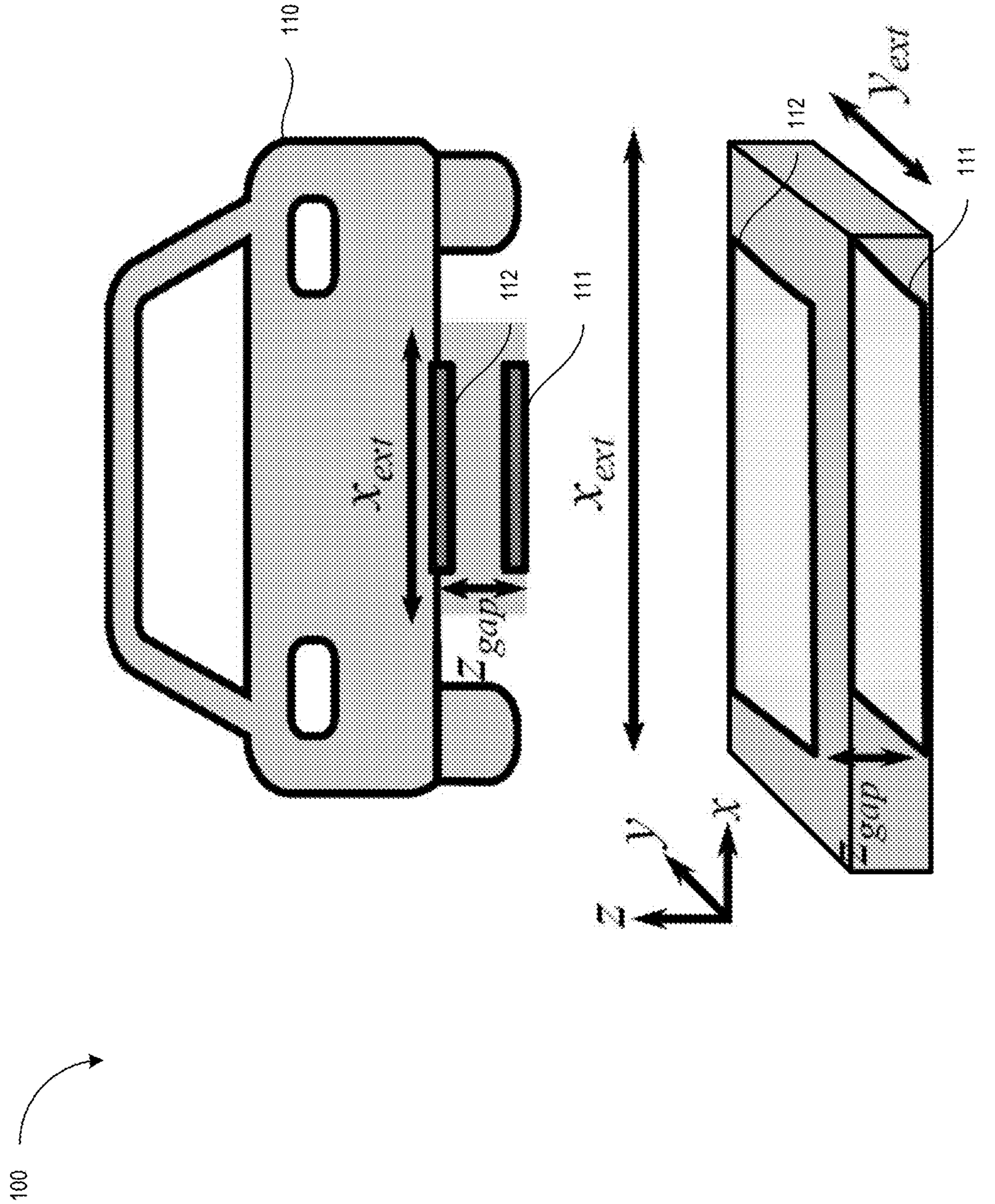
FIG. 1 is a diagram illustrating an example wireless power transfer system, in accordance with one or more embodiments of the present disclosure.

FIG. 1 is a diagram illustrating an example wireless power transfer system 100, in accordance with one or more embodiments of the present disclosure. The wireless power transfer system 100 may allow the transmission of electrical energy (e.g., power) to a device without using wires or a physical link. For example, the wireless power transfer system 100 may be used to provide power to and/or charge the vehicle 110 (e.g., an electric vehicle, a hybrid vehicle, etc.) or some other device. The wireless power transfer system 100 includes coil 111 and coil 112. Both coils 111 and 112 may include one or more wire coils (e.g., copper wire coils) with various shapes/geometries. The extents (e.g., dimensions) of the coil 111 and coil 112 are represented by $x_{ext}$ (e.g., the length of a coil) and $y_{ext}$ (e.g., the width of a coil). The wireless power transfer system 100 may also be referred to as a wireless charging system.

In one embodiment, the wireless power transfer system 100 may use the coil 111 to generate a time-varying electromagnetic field. The coil 111 may be driven by a power source. The electromagnetic field may transmit power wirelessly across a distance $z_{gap}$ and to coil 112. The vehicle 110 may extract power from the electromagnetic field that via coil 112 and may supply it to an electrical load. The coil 111 may be referred to as a transmitting coil, a transmitter, a primary coil, etc. The coil 112 may be referred to as a receiving coil, a receiver, a secondary coil, etc. The wireless power transfer system 100 may provide power to the vehicle via inductive coupling (e.g., electromagnetic induction, inductive power transfer (IPT), etc.). The power is transferred from coil 111 to coil 111 via a magnetic field. The coils 111 and 112 together may form a transformer. An alternating current (AC) passed through the coil 111 creates an oscillating magnetic field (B). The magnetic field passes through the coil 112, where it induces an alternating electromagnetic force (e.g., voltage), which creates an alternating current. In one embodiment, the wireless power transfer system may be a near field system. A near field system may be a system where power transferred over short distances by magnetic fields using inductive coupling between the coils 111 and 112.

The wireless power transmission system can reduce and/or eliminate the use of the wires when charging the vehicle 110. This may increase the mobility, convenience and/or safety when charging the vehicle 110. For example, the wireless power transmission system may be able to charge the vehicle 110 while the vehicle is moving. In another example, it may be more convenient for drivers to charge the vehicle 110 by simply parking or moving the vehicle 110 over the coil 111, rather than plugging in a charging cable. In addition, because no physical wires are connected to the vehicle, it may be safer for a user to charge the vehicle.

Figure 2:
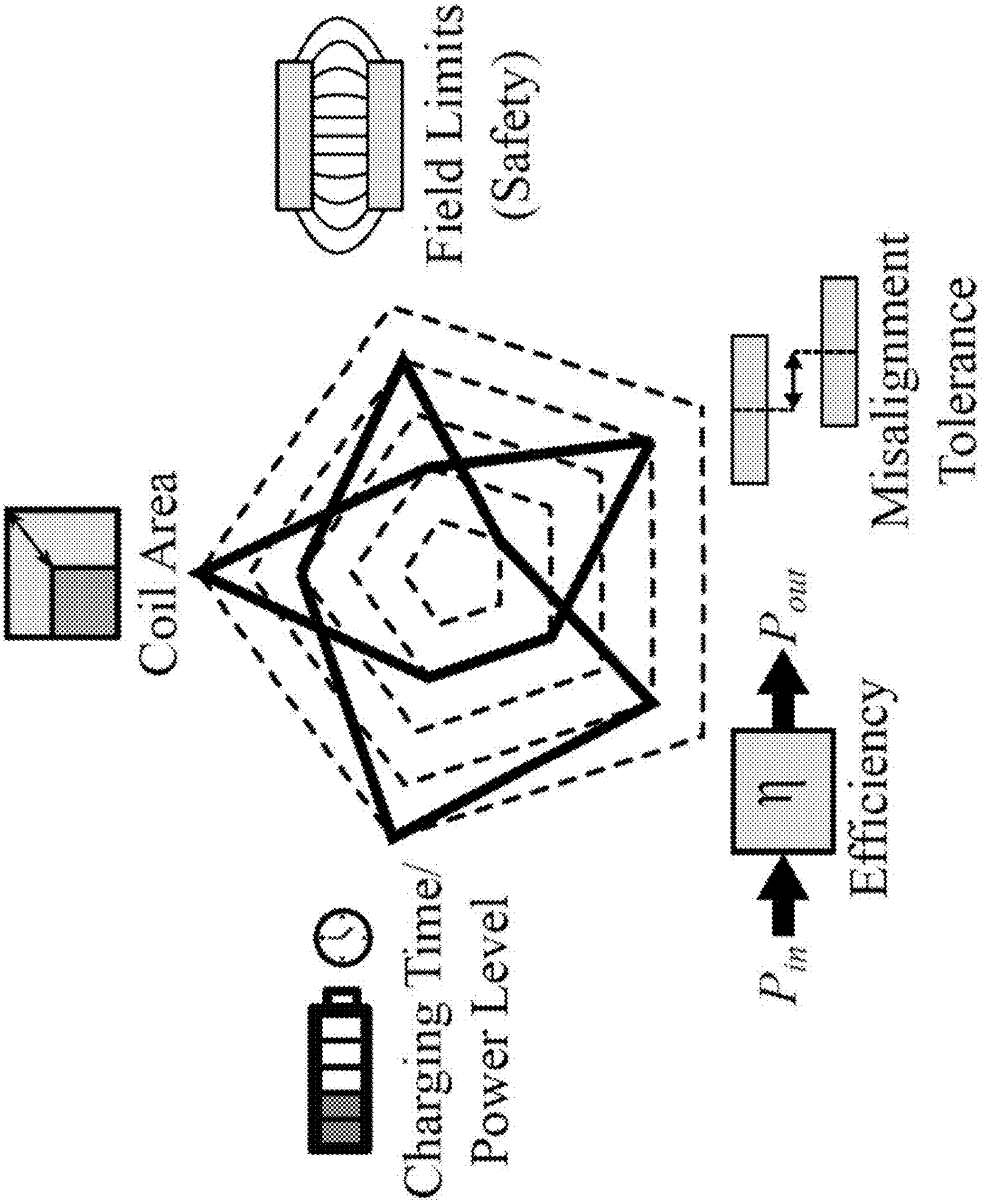
FIG. 2 is a diagram illustrating example parameters for a wireless power transfer system, in accordance with one or more embodiments of the present disclosure.

FIG. 2 is a diagram illustrating example parameters for a wireless power transfer system, in accordance with one or more embodiments of the present disclosure. As discussed above, a wireless power transfer system may allow the transmission of electrical energy (e.g., power) to a device without using wires or a physical link. The wireless power transfer system may include a primary coil (e.g., a transmitter coil) to generate a magnetic field. The device may include a secondary coil (e.g., a receiver coil) to extract power from the magnetic field. In one embodiment, the wireless power system may satisfy various parameters (e.g., factors, criteria, constraints, specifications, etc.) that may be set forth by users, manufacturers, etc., of the wireless power system. Examples of these parameters are illustrated in FIG. 2.

One parameter may be the charging time or power level of the wireless power system. The charging time may be the amount of time for the wireless power transfer system to transfer a certain amount of power to a device (e.g., the amount of time to fully charge a device, such as a vehicle). This parameter may indicate a maximum charging time that is allowed for the wireless power system.

Another parameter may be the efficiency of the wireless power transfer system. The efficiency of the wireless power transfer system may be determined based on the amount of energy used to generate the magnetic field and the amount of energy received by the device. This parameter may indicate a minimum efficiency for the wireless power system.

A further parameter may be field limits. The field limits may indicate limits on the size and/or strength of the magnetic field generated by the wireless power system. For example, the field limits may indicate how far the magnetic field can extend in the x, y, and z directions and how strong the magnetic field should be at different distances. The field limits may also be referred to as stray field limits.

Yet another parameter may be the misalignment tolerance. The misalignment tolerance may indicate distance of misalignment between the primary and secondary coils that the wireless power transfer system should be able to tolerate. For example, the misalignment tolerance may indicate a minimum misalignment distance for which the wireless power transfer system is still able to transfer power to a device.

Coil area may be another parameter. The coil area may refer to the dimensions, size, shape, geometry, etc., of the coils used by the wireless power transfer system. For example, the coil area may refer to a desired length and/or width for the primary coil of the wireless power transfer system.

The computation/calculation of the magnetic fields and inductances of various coil geometries may be performed when designing a wireless power transfer system based on parameters (e.g., input parameters) such as power level, coupling, air gap, misalignment tolerance, field limits, and efficiency. The computation is generally performed using finite element analysis (FEA) approaches. An FEA approach may subdivides a large system/problem into smaller, simpler parts that are called finite elements. This may be achieved by a particular space discretization in the space dimensions, which is implemented by the construction of a mesh of the object. The FEA formulation of a boundary value problem results in a system of algebraic equations. The simple equations that model these finite elements may be assembled into a larger system of equations that models the entire problem.

Generally, a candidate, parameterized coil geometry should be defined before the design process for the wireless power transfer system begins. This may limit the types of coil geometries considered in the design. More complex coil geometries such as bipolar coils, and coils with shielding turns have been shown to enable higher power levels under stray field limits. However, attempting to consider all possible coil geometries (as well as other input/design parameters such as operating frequency, number of turns, and conductor types) when performing the FEA simulations may result in a large number of possibilities. Performing the FEA on these large number of possibilities may be near impossible. In addition, the FEA is often a manual, time consuming, computationally expensive, and difficult process.

Thus, faster, more efficient, and/or less computationally expensive method for determining coil shapes/geometries (that satisfy various input parameters) may be very useful. The embodiments, examples, and/or implementations described here may provide a Fourier analysis method which may be used to determine coil shapes/geometries that satisfy various input parameters. In the Fourier analysis method (FAM), the magnetic fields are first designed to optimize performance through variation of Fourier basis function coefficients. The computed fields are then discretized into winding geometries, without constraint on winding shape. This allows for the quicker and/or faster computation of the coil geometry/shape, coil inductances, currents, and magnetic fields.

Figure 3:
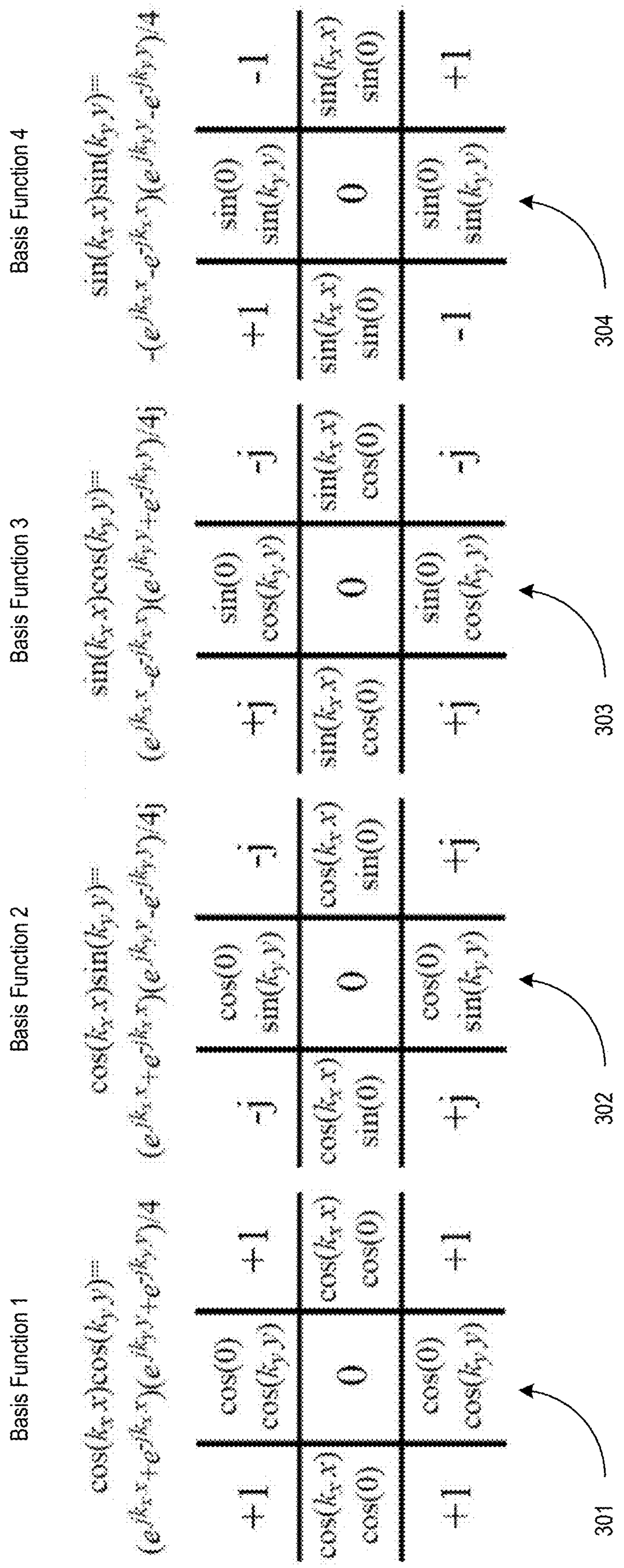
FIG. 3 is a diagram illustrating example basis functions for generating one or more coil geometries, in accordance with one or more embodiments of the present disclosure.

FIG. 3 is a diagram illustrating example basis functions for generating one or more coil geometries, in accordance with one or more embodiments of the present disclosure. The basis functions may be used in the Fourier analysis method for determining coil geometries/shapes for a wireless power transfer system. In one embodiment, the scalar magnetic potential of one or more coil geometries (e.g., coil shapes) may be modeled as a function of the coefficients of one or more of basis function 1, basis function 2, basis function 3, and basis function 4. The basis functions 1 through 4 may be Fourier basis functions. The basis functions 1 through 4 may be two-dimensional sinusoidal functions of different spatial wavelengths in a Cartesian coordinate system (e.g., a Cartesian x-y plane). Each basis function is defined by spatial wavenumbers $k_x$ and $k_y$ in the x and y directions, in units of radians per meter.

Basis function 1 may be defined as follows: $\cos(k_x x)\cos(k_y y)=(e^{jk_x x}+e^{-jk_x x})(e^{jk_y y}+e^{-jk_y y})/4$. Using basis function 1 in the Fourier analysis method may generate rectangular, circular, and/or other unipolar coil geometries/shapes. Using basis function 1 may also generate coil shapes/geometries with an odd numbers of poles.

Basis function 2 may be defined as follows: $\cos(k_x x)\sin(k_y y)=(e^{jk_x x}+e^{-jk_x x})(e^{jk_y y}-e^{-jk_y y})/4j$. Using basis function 2 in the Fourier analysis method may generate bipolar shapes.

Using basis function 2 may also generate coil shapes/geometries that have an even number of poles oriented in they direction.

Basis function 3 may be defined as follows: $\sin(k_x x)\cos(k_y y)=(e^{jk_x x}-e^{-jk_x x})(e^{jk_y y}+e^{-jk_y y})/4j$. Using basis function 3 in the Fourier analysis method may generate bipolar shapes. Using basis function 3 may also generate coil shapes/geometries that have an even number of poles oriented in the x direction.

Basis function 4 may be defined as follows: $\sin(k_x x)\sin(k_y y)=-(e^{jk_x x}-e^{-jk_x x})(e^{kj_y y}-e^{-jk_y y})/4$. Using basis function 4 in the Fourier analysis method may generate coil shapes/geometries that have a number of poles which is a multiple of 4.

The symmetry conditions for each of the basis functions 1 through 4 are also illustrated in FIG. 3. For example, symmetry conditions 301 apply to basis function 1, symmetry conditions 302 apply to basis function 3, symmetry conditions 303 apply to basis function 3, and symmetry conditions 304 apply to basis function 4.

In some embodiments, the Fourier analysis method described herein may use any combination of the basis functions 1 through 4. For example, only basis function 1 may be used. In another example, basis functions 1 and 3 may be used. In a further example, basis functions, 1, 2, 3, and 4 may all be used. The basis functions may be selected/identified based on input parameters provided to the Fourier analysis method. Although the present disclosure may refer to Fourier basis functions, other types of basis functions may be used in other embodiments. For example, Gaussian basis functions, piecewise linear basis functions, polynomial/quadratic basis functions, etc., may be used in other embodiments.

Figure 4:
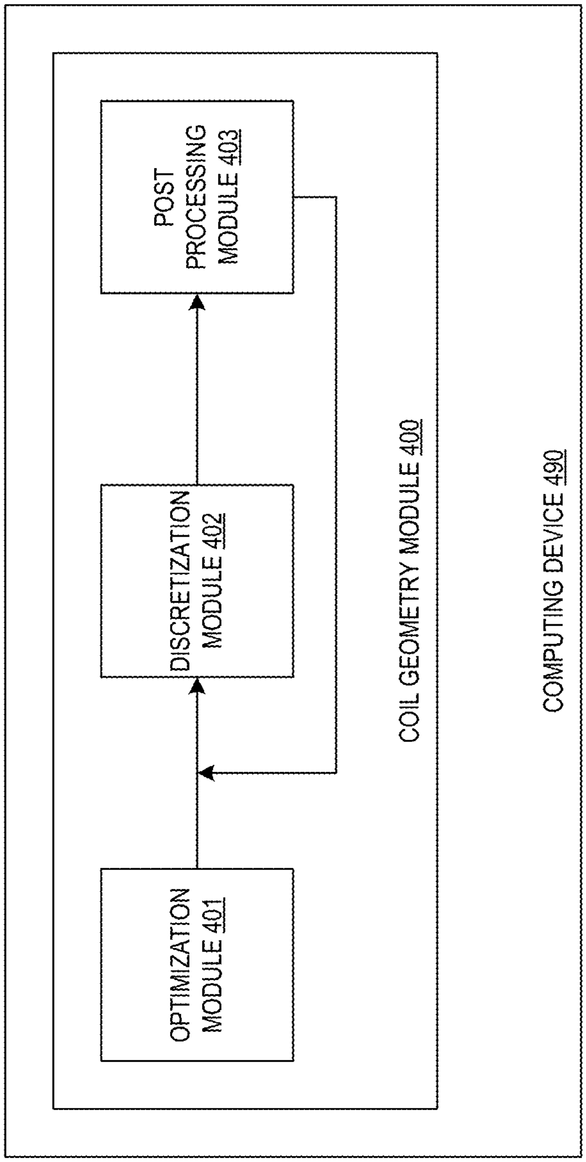
FIG. 4 is a diagram illustrating an example coil geometry module, in accordance with one or more embodiments of the present disclosure.

FIG. 4 is a diagram illustrating an example coil geometry module 400, in accordance with one or more embodiments of the present disclosure. The coil geometry module 400 may be located in a computing device 490. The computing device 490 may include hardware such as processing devices (e.g., processors, central processing units (CPUs), programmable logic devices (PLDs), etc.), memory (e.g., random access memory (e.g., RAM), storage devices (e.g., hard-disk drive (HDD), solid-state drive (SSD), etc.), and other hardware devices (e.g., sound card, video card, etc.). The computing device 490 may be any suitable type of computing device or machine that has a programmable processor including, for example, server computers, desktop computers, laptop computers, tablet computers, smartphones, set-top boxes, etc. In some examples, the computing device 490 may comprise a single machine or may include multiple interconnected machines (e.g., multiple servers configured in a cluster). The computing device 490 may execute or include an operating system (OS). The OS may manage the execution of other components (e.g., software, applications, etc.) and/or may manage access to the hardware (e.g., processors, memory, storage devices etc.) of the computing device 490. Although the present disclosure may refer to a computing device 490, the coil geometry module 400 may be located on other types of computing environment, such as virtual environments, in other embodiments. For example, the coil geometry module 400 may be located in a virtual machine (VM), a container, etc., in other embodiments.

As discussed above, the scalar magnetic potential of one or more coil geometries (e.g., coil shapes) may be modeled as a function of the coefficients of Fourier basis functions illustrated above (e.g., Fourier basis functions, basis functions 1 through 4 illustrated in FIG. 3). The functions may be two-dimensional sinusoidal functions of different spatial wavelengths in a Cartesian coordinate system (e.g., a Cartesian x-y plane). Each basis function is defined by spatial wavenumbers $k_x$ and $k_y$ in the x and y directions, in units of radians per meter. The spatial wavenumber $k_z$ in the z direction may be function of $k_x$ and $k_y$, as discussed in more detail below. The Fourier basis functions used to model the magnetic potential may be identified/selected based on one or more input parameters provided to the coil geometry module 400. For example, a user may provide input/parameters identifying which Fourier basis functions should be used.

The coil geometry module 400 may obtain (e.g., generate, calculate, determine, etc.) a set of matrices of coefficients for each basis that is indicated (e.g., selected) in the input parameters 420. The one or more matrices (of coefficients) may be used as optimization variables, as discussed in more detail below. Each matrix (of coefficients) may be obtained (e.g., generated, calculated, determined, etc.) by obtaining a portion of the matrix (e.g., a N×N) portion of the matrix, and multiplying and reflecting the portion of the matrix according to the symmetry conditions illustrated above in FIG. 3). The summation of these matrices (e.g., a summed matrix) may result in the Fourier domain coefficients $\psi(k_x, k_y)=\psi(m,n)$ of one or more coil geometries. $\psi(m,n)$, which may be a summed matrix, may represent the magnetic potential of the one or more coil geometries on the Fourier domain. The scalar magnetic potential in the spatial domain, $\Psi(x,y,z)$, may be the inverse discrete Fourier transform (IDFT) of the summed matrix.

The coil geometry module 400 includes an optimization module 401. A discretization module 402, and a post processing module 403. In one embodiment, optimization module 401 may obtain (e.g., determine, generate, calculate, identify, etc.) one or more coil shapes/geometries for a wireless power transfer system based on any combination of the equations (1) through (34), which are discussed in more detail below. The discretization module 402 may discretize the magnetic fields determined by the optimization module 410 to determine winding geometries for the coil, based on a desire number of turns in the coil. The discretization module 402 may determine contours of the coil shape by determining equipotential contours of the magnetic scalar potential at values defined by equations (19) and (20) above. The discretization module 402 may also determine the RMS voltage and current of the system based in the number of turns (e.g., by dividing the total span of the magnetic scalar potential into discrete segments with a contour placed in the middle of each segment). The self and mutual inductances of the coil may be determined based on the relationship between the coil current and energy illustrated in equation (17). Losses in the conductors, and the total length of the conductors may be calculated using a line-integration of the contours and the fields at the surface of the coils. The external proximity effect loss may depend, at least partly on the external alternating field on a conductor due to the presence of other conductors. By using this information, the different number of turns can be iterated and changed (e.g., modified, tuned, etc.) with some constraint on how large the actual conductors are illustrated in equation (35). The post processing module 403 may perform various post processing operations, such as loss calculations, efficiency calculations, determining misalignment performance, determining component ratings, determining cost/weight of a coil, inductances, determining ferrite losses, etc. Based on the post processing operations, the discretization module 402 may re-determine winding geometries for the coil. For example, if the post processing operations indicate that the cost/weight of the coil exceeds a threshold, the discretization module 402 may re-determine winding geometries for the coil to reduce the cost/weight.

In one embodiment, the magnetic potential of the one or more coils, Ψ(x,y,z), may be obtained based on equation (1) below.

$$\Psi(x, y, z) = \sum_{m=0}^{2N-1} \sum_{n=0}^{2N-1} \psi(m, n) e^{j(k_x x + k_y y + k_z z)} / 4 \quad (1)$$

Using equation (1), the potentials at each spatial point of the x-y plane may be calculated with discretization in the x and y dimensions of dx and dy.

Because the basis functions 1 through 4 may be Fourier basis functions, the basis functions can be directly differentiated and/or integrated. Algebraic relations between the magnetic potential Ψ and the magnetic field B may be obtained by integrating and/or differentiating the basis functions. The relationship between the magnetic potential Ψ and the magnetic field B may be represented as follows: $B=\mu_0 H=-\mu_0 \nabla\Psi$. The wavenumber $k_z$ may be derivable because $\nabla \times B=0$ in the absence of air gap currents. Combined with $\nabla \cdot B=0$, the magnetic fields and magnetic potentials satisfy equation (2) below.

$$\nabla^2 \Psi = \nabla^2 B = 0 \quad (2)$$

Based on equation (2) it can be determined that when real, non-zero wavenumbers exist in the x and y directions, $k_z$ is imaginary and can be determined using equation (3) below.

$$k_z = \pm\sqrt{-k_x^2 - k_y^2} = \pm j\gamma \quad (3)$$

The magnetic potential in the air gap (e.g., the space and/or distance between the primary coil on the wireless charger and the secondary coil on the vehicle/device) should satisfy equation (4) below.

$$\frac{\partial^2 \Psi}{\partial z^2} - k_z^2 \Psi = 0 \quad (4)$$

The solution to equation (4) may be represented by equation (5) below.

$$\Psi(z) = c_1 e^{-\gamma z} + c_2 e^{\gamma z} \quad (5)$$

The constants $c_1$ and $c_2$ may be obtained (e.g., determined, generated, calculated, etc.) by using the boundary conditions at Ψ(0) and at $\Psi(z_{gap})$. Equation (5) may be rewritten as equation (6) below.

$$\Psi(z) = \frac{\sinh \gamma z}{\sinh \gamma z_{gap}} \Psi(z_{gap}) - \frac{\sinh \gamma (z - z_{gap})}{\sinh \gamma z_{gap}} \Psi(0) \quad (6)$$

By differentiating equation (6) using $B=\mu_0 H=-\mu_0 \nabla\Psi$, the $B_z$ field at z=0 and $z=z_{gap}$ can be found using equation (7) below.

$$\begin{bmatrix} B_z(z_{gap}) \\ B_z(0) \end{bmatrix} = -\mu_0 \gamma \begin{bmatrix} \coth \gamma z_{gap} & -\frac{1}{\sinh \gamma z_{gap}} \\ \frac{1}{\sinh \gamma z_{gap}} & -\coth \gamma z_{gap} \end{bmatrix} \begin{bmatrix} \Psi(z_{gap}) \\ \Psi(0) \end{bmatrix} \quad (7)$$

The magnetic field at the secondary coil (e.g., the coil located on the vehicle/device that is charging) where $z=z_{gap}$ is a function of $z_{gap}$ and $$\gamma = \sqrt{k_x^2 + k_y^2}$$

for ferrite backed coils. This may be due to the potential of the primary coil varying in the x–y plane at z=0. In one embodiment, the x, y, and z components of the magnetic field B at the secondary coil may be determined using the equations (8), (9) and (10) below, respectively.

$$B_x(x, y, z_{gap}) = -\sum_{m=1}^{2N-1} \sum_{n=1}^{2N-1} -\mu_0 j k_x \psi(m, n) e^{j(k_x x + k_y y)} / 4 \sinh \gamma z_{gap} \quad (8)$$

$$B_y(x, y, z_{gap}) = \sum_{m=1}^{2N-1} \sum_{n=1}^{2N-1} -\mu_0 j k_y \psi(m, n) e^{j(k_x x + k_y y)} / 4 \sinh \gamma z_{gap} \quad (9)$$

$$B_z(x, y, z_{gap}) = \sum_{m=1}^{2N-1} \sum_{n=1}^{2N-1} -\mu_0 \gamma \psi(m, n) e^{j(k_x x + k_y y)} / 4 \sinh \gamma z_{gap} \quad (10)$$

For example, the x component of the magnetic field B may be determined using equation (8), the y component of the magnetic field B may be determined using equation (9), and the z component of the magnetic field B may be determined using equation (10).

In one embodiment, the magnetic fields for air-core coils (e.g., coils without ferrite backing) may be half or less than half of the magnetic fields for ferrite backed coils. For air core coils, the $B_z$ field at z=0 and $z=z_{gap}$ can be found using equation (11) below.

$$\begin{bmatrix} B_z(z_{gap}) \\ B_z(0) \end{bmatrix} = -\mu_0 \gamma \begin{bmatrix} 1/2 & -e^{-\gamma z_{gap}} \\ e^{-\gamma z_{gap}} & -1/2 \end{bmatrix} \begin{bmatrix} \Psi(z_{gap}) \\ \Psi(0) \end{bmatrix} \quad (11)$$

Based on equations (6)-(11), it can be determined that magnetic fields with higher $k_x$ and $k_y$ will decrease in magnitude faster in the z direction than those with smaller $k_x$ and $k_y$. This may indicate that coil shapes/geometries with larger diameters (e.g., larger area) may have fields that decay more slowly away from the coil than those of smaller diameters.

In one embodiment, the magnetic potentials of a coil shape/geometry may be determined by the currents (e.g., electrical current) that are flowing in the x-y plane of the coil. The continuous surface currents in the x and y directions of the coil may be represented by the terms $K_x$ and $K_y$. The magnetic potentials of the coil in the x-y plane of the coil may be determined using equation (12) below.

$$K = \nabla \times \hat{k}\Psi = \frac{\partial \Psi}{dy}\hat{i} - \frac{\partial \Psi}{dx}\hat{j} \quad (12)$$

The magnetic potentials in the x direction (e.g., the x component of the magnetic potential) and they direction (e.g., they component of the magnetic potential) may be determined using equations (13) and (14) below, respectively.

$$K_x(x, y, 0) = \sum_{m=1}^{2N-1} \sum_{n=1}^{2N-1} jk_y \psi(m, n) e^{j(k_x x + k_y y)}/4 \tag{13}$$

$$K_y(x, y, 0) = \sum_{m=1}^{2N-1} \sum_{n=1}^{2N-1} -jk_x \psi(m, n) e^{j(k_x x + k_y y)}/4 \tag{14}$$

In one embodiment, the mutual magnetic energy $E_m$ and the self-magnetic energy $E_s$ of a coil shape/geometry may be determined using equations (15) and (16) below.

$$E_m(\psi) = \int_\Omega \Psi(x, y, 0) B_z(x, y, z_{gap}) d\Omega \tag{15}$$

$$E_s(\psi) = \frac{1}{2} \int_\Omega \Psi(x, y, 0) B_z(x, y, 0) d\Omega \tag{16}$$

The total magnetic energy of the wireless power transfer system may be determined using equation (17) below.

$$W = E_{s1}(\psi) + E_{s2}(\psi) + E_m(\psi) = \frac{1}{2} L_1 I_1^2 + \frac{1}{2} L_2 I_2^2 + M I_1 I_2 \tag{17}$$

In one embodiment, $L_1=L_2$ and $I_1=I_2$ if the wireless power transfer system uses matched coils. $L_1$ and $L_2$ represent the self-inductance of the primary and second coil, respectively. $I_1$ and $I_2$ represent the root mean square (RMS) current of the primary and second coil, respectively. When the wireless power transfer system uses match coils, the coupling coefficient k of the wireless power transfer system may be determined using equation (18) below.

$$k = \frac{E_m(\psi)}{2E_s(\psi)} = \frac{\int_\Omega \Psi(x, y, 0) B_z(x, y, z_{gap})\, d\Omega}{\int_\Omega \Psi(x, y, 0) B_z(x, y, 0)\, d\Omega} \tag{18}$$

By choosing the number of turns of the coil, $N_T$, the conductor paths, currents, and coil shape are determined by the contours C of the continuous magnetic potential using equations (19) and (20) below.

$$I_1 = (\max \Psi(x, y, 0) - \min \Psi(x, y, 0))/N_T \tag{19}$$

$$C = \min \Psi(x, y, 0) + \left(0 : (N_T - 1) + \frac{1}{2}\right) I_1 \tag{20}$$

Once the RMS currents of the primary coil and the secondary coil (e.g., $I_1$ and $I_2$ respectively) are determined, equation (17) can be used to determine the self-inductances of the primary and secondary coils, $L_1$ and $L_2$ respectively. Equation (17) can also be used to determine the mutual inductance of the wireless power transfer system M once the RMS currents of the primary coil and the secondary coil (e.g., $I_1$ and $I_2$ respectively) are determined. Once the RMS currents of the primary coil and the secondary coil (e.g., $I_1$ and $I_2$ respectively) and the mutual inductance of the wireless power transfer system M are determined, the coil-to-coil power transfer P of the wireless power transfer system may be determined using equation (21) below.

$$P = 2\pi f E_m(\psi) = 2\pi f M I_1 I_2 \tag{21}$$

As discussed above, the primary and secondary RMS currents may be equal (e.g., $I_1=I_2$) in one embodiment. The primary and secondary coils may also be matched and operating at resonance close to an optimal load. A compensated, series-series wireless power transfer system may be modeled using equation (22) below.

$$\begin{bmatrix} V_1 \\ 0 \end{bmatrix} = \begin{bmatrix} R_1 & -j\omega M \\ -j\omega M & R_2 + R_L \end{bmatrix} \begin{bmatrix} I_1 \\ I_2 \end{bmatrix} \tag{22}$$

$R_L$ may represent the equivalent alternating current (AC) load resistance on the secondary side. $R_1$ and $R_2$ may represent the parasitic resitances in the primary and secondary coils, respectively.

By solving for the output power $$P_{out} = I_2^2 R_L$$

and dividing by the input power $P_{in}=V_1 I_1$, the efficiency of the wireless power transfer system may be determined using equation (23) below.

$$\eta = P_{out}/P_{in} = I_2^2\ R_L/(V_1\ I_1) = \frac{(\omega M)^2 R_L}{(R_L + R_2)\left[(\omega M)^2 + R_1(R_L + R_2)\right]} \tag{23}$$

By differentiating and setting the derivative with respect to $R_L$ equal to zero, the optimal load, $R_{L,opt}$, may be determined using equation (24) below.

$$R_{L,opt} = R_2 \sqrt{1 + \frac{(\omega M)^2}{R_1 R_2}} \tag{24}$$

If the wireless power transfer system uses matched coils, $R_1=R_2$ and the optimal load resistance may approximate ωM. When operating with a load close to the optimal load $R_{L,opt}$, the phase of the input impedance may be relatively flat with frequency around resonance, such that current does not become inductive with a small increase in frequency above resonance to ensure the soft-switching of the inverter. This may be avoided by setting $R_L$ slightly above $R_{L,opt}$. $I_1$ may still approximate $I_2$ for wireless power transfer system using matched coils.

As discussed above, a multi-objective optimization may be obtained (e.g., generated, calculated, formulated, etc.) and solved to determine one or more coil shapes/geometries that satisfies one or more objects and/or constraints. The multi-object optimization may minimize the total current in the coil of the wireless power transfer system and may also limit the stray field maximum outside of the coil extents (e.g., outside the area occupied by the coil). In one embodiment, the optimization maybe formulated as a minimization of the surface integral of the total current in the coil squared, $\int_\Omega K(x,y,0)^2 d\Omega$. The surface integral may be represented using equation (25) below.

$$\int_\Omega K(x, y, 0)^2 d\Omega = \sum_{m=1}^{2N-1} \sum_{n=1}^{2N-1} \left(\|K_x(\psi)\|_2^2 + \|K_y(\psi)\|_2^2\right)/16 \tag{25}$$

The Fourier transfer may be a unitary function which avoids the computation of K(x,y,0) for in each step of evaluating the object function. The 1-norm of the magnitude of the basis function coefficient ψ may be added to eliminate and/or reduce small values of unused basis functions sets (e.g., sin 0 cos y) to generate the objective function illustrated in in equation (26) below.

$$\frac{\|K_x(\psi)\|_2^2+\|K_y(\psi)\|_2^2}{16P}+0.1\left(\frac{\|\psi\|_1}{P}\right) \quad (26)$$

In one embodiment, a constraint may be the coil-coil power transfer which may be computed using equation (21) above to obtain equation (27) below.

$$(P-2\pi f E_m(\psi))/P \leq 0 \quad (27)$$

In one embodiment, another constraint may be the maximum average stray magnetic field magnitude $B_{str,lim}$ in the air gap outside the measurement extents $x_{meas}$ and $y_{meas}$. This constraint may be represented using equation (28) below.

$$(\|B_{str,avg}(x,y)\|_{50}-B_{str,lim})/B_{str,lim} \leq 0 \quad (28)$$

The inclusion of the stray field (e.g., $B_{str,lim}$) as a constraint may help ensure that the wireless power transfer system complies with safety standards on magnetic field exposure. This may be computed as the 50-norm of the spatial stray-field matrix which may approximate the infinity norm or maximum magnitude of the matrix. $B_{str,avg}$ may represent the average field magnitude outside the measurement extents $x_{meas}$ and $y_{meas}$ and may be computed similar to the average magnetic field average $B_{avg}$. Computing $B_{avg}$ is illustrated in equation (32) below. The average of the magnetic fields in the air gap is derived by integrating the contribution from each basis function from z=0 to $z=z_{gap}$ and dividing by $z_{gap}$ to obtain the average magnetic field in the air gap as illustrated in equations (29)-(31) below.

$$B_{x,avg}(x,y)=\sum_{m=1}^{2N-1}\sum_{n=1}^{2N-1}-\mu_0 jk_x\psi(m,n)e^{j(k_x x+k_y y)}\frac{1}{\gamma z_{gap}} \quad (29)$$

$$B_{y,avg}(x,y)=\sum_{m=1}^{2N-1}\sum_{n=1}^{2N-1}-\mu_0 jk_y\psi(m,n)e^{j(k_x x+k_y y)}\frac{1}{\gamma z_{gap}} \quad (30)$$

$$B_{z,avg}(x,y)=\sum_{m=1}^{2N-1}\sum_{n=1}^{2N-1}-\mu_0 \gamma\psi(m,n)e^{j(k_x x+k_y y)}\frac{1}{\gamma z_{gap}} \quad (31)$$

$B_{x,avg}$(x,y) represents the average of the magnetic field magnitude in the x direction. $B_{y,avg}$(x,y) represents the average of the magnetic field magnitude in the y direction. $B_{z,avg}$(x,y) represents the average of the magnetic field magnitude in the z direction. Based on equations (29)-(31), the average magnetic field average $B_{avg}$ may be determined based on equation (32) below.

$$B_{avg}(x,y)=\sqrt{(B_{x,avg}(x,y))^2+(B_{y,avg}(x,y))^2+(B_{z,avg}(x,y))^2} \quad (32)$$

In one embodiment, a third constraint may be a limit on the continuous current density to the coil extents $x_{ext}$ (e.g., the length of the coil shape/geometry) and $y_{ext}$ (e.g., the width of the coil shape/geometry), such that the surface integral of the stray current squared, $\int_\Omega K_{str}(x,y,0)^2 d\Omega$, is less than or equal to a threshold percentage, of the surface integral of the total current $\int_\Omega K(x,y,3)^2 d\Omega$. This may be represented as equation (33) below.

$$\left(\int_\Omega K_{str}(x,y,0)^2 d\Omega-\alpha\int_\Omega K(x,y,0)^2 d\Omega\right)\Big/\int_\Omega K(x,y,0)^2 d\Omega \leq 0 \quad (33)$$

Thus, the objective function (e.g., optimization problem) for obtaining one or more coil geometries that satisfy one or more input parameters and/or constraints may be represented by equation (34) below.

$$\min\left(\frac{\|K_x(\psi)\|_2^2+\|K_y(\psi)\|_2^2}{16P}+0.1\left(\frac{\|\psi\|_1}{P}\right)\right) \quad (34)$$

The equation (34) may be solved such that the constraints represented by equations (21), (28) and (33) are satisfied. Solving for equation (34) while satisfying the constraints represented by equations (21), (28) and (33) may generate one or more coil geometries/shapes for the wireless power transfer system.

Figure 5:
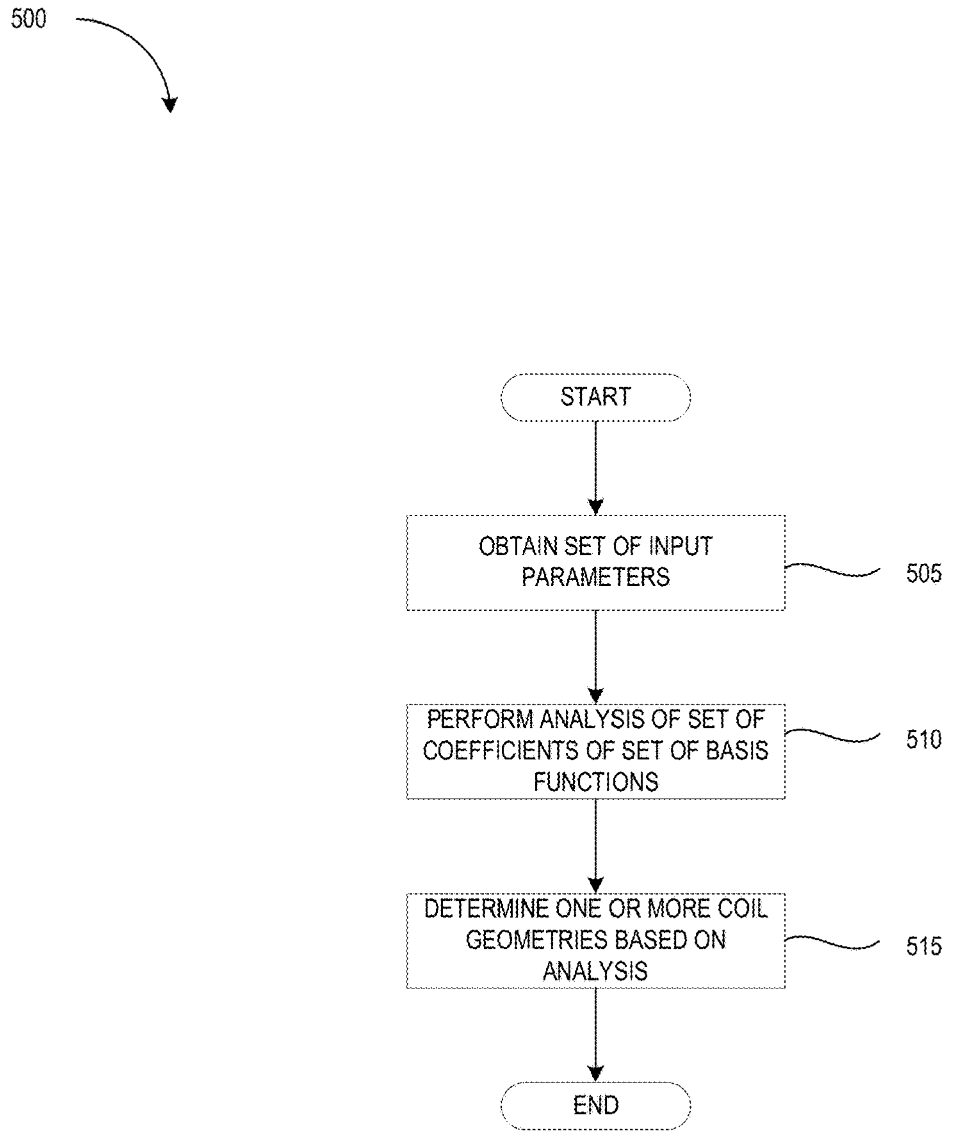
FIG. 5 is a flow diagram illustrating an example process for obtaining one or more coil geometries, in accordance with one or more embodiments of the present disclosure.

FIG. 5 is a flow diagram illustrating an example process for obtaining one or more coil geometries, in accordance with one or more embodiments of the present disclosure. Process 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 500 may be performed by one or more of a computing device (e.g., computing device 490 illustrated in FIG. 4) and a coil geometry module (e.g., coil geometry module 400 illustrated in FIG. 4).

With reference to FIG. 5, process 500 illustrates example functions used by various embodiments. Although specific function blocks ("blocks") are disclosed in process 500, such blocks are examples. That is, embodiments are well suited to performing various other blocks or variations of the blocks recited in process 500. It is appreciated that the blocks in process 500 may be performed in an order different than presented, and that not all of the blocks in process 500 may be performed. In addition, additional other blocks (not illustrated in FIG. 5) may be inserted between the blocks illustrated in FIG. 5.

The process 500 begins at block 505 where the process 500 obtains a set of input parameters that may be used in conjunction with a set of basis functions (e.g., basis functions 1-4 illustrated in FIG. 3, Fourier basis functions, etc.). For example, the process 500 may receive user input indicating a power efficiency, coil area/dimensions, stray field limits, etc. The process 500 may also receive input parameters indicating which basis functions (from a set of basis functions) should be used.

At block 510, the process may perform an analysis of the set of coefficients of the set of basis functions. For example, a Fourier analysis method may be used to model the scalar magnetic potential of one or more coil geometries (e.g., coil shapes) as a function of the coefficients of the set of basis functions. The Fourier analysis method may be used to determine coil shapes/geometries that satisfy the input parameters. The Fourier analysis may design magnetic fields for a coil by optimizing performance through variation of Fourier basis function coefficients.

At block 515 process 500 may determine one or more coil geometries/shapes based on the analysis performed in block 510. For example, the analysis may determine magnetic fields for a coil using the basis functions. The process 500 may discretize the magnetic fields to identify winding geometries for the coil.

Figure 6:
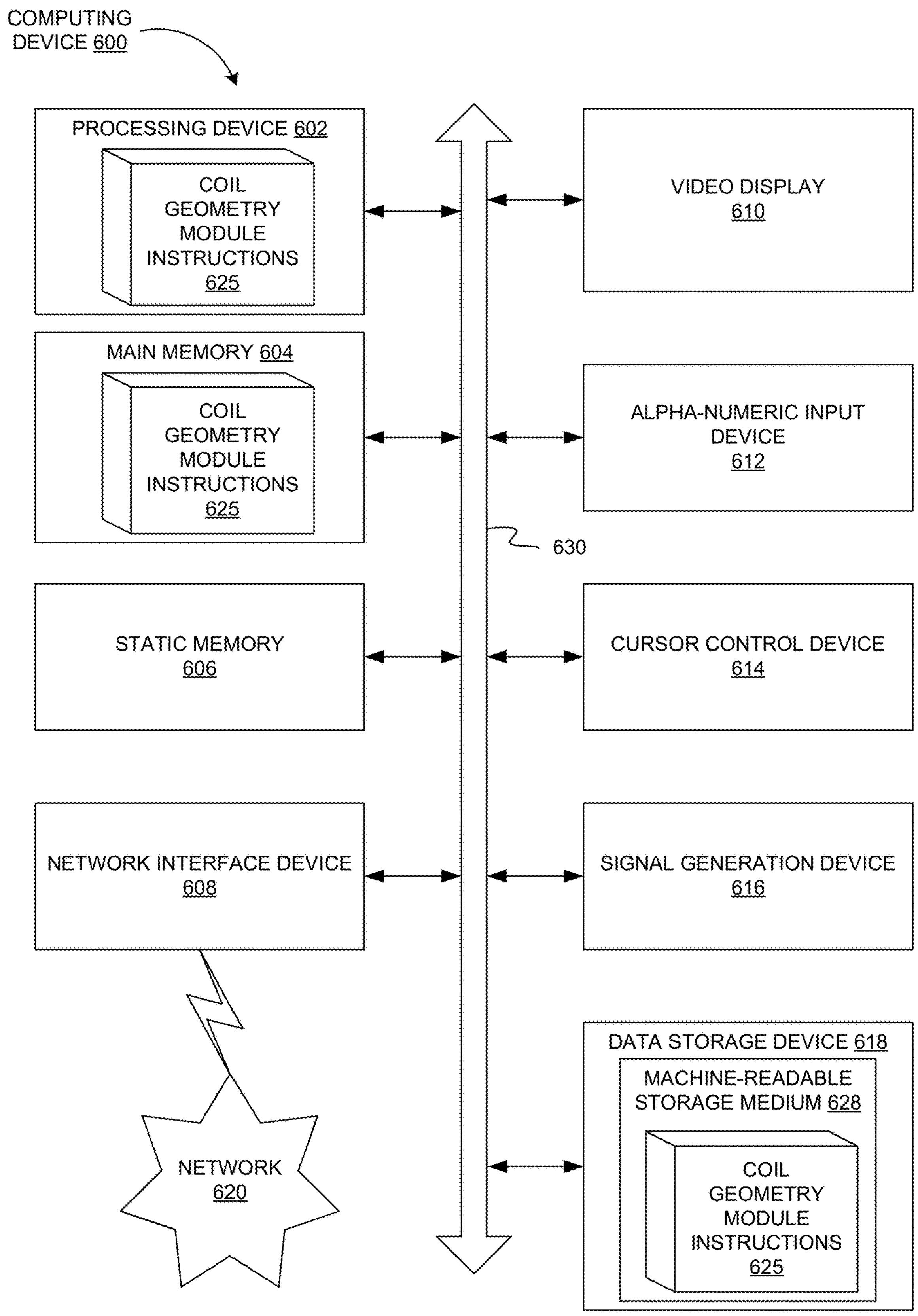
FIG. 6 is a block diagram illustrating an example computing device, in accordance with one or more embodiments of the present disclosure.

FIG. 6 is a block diagram of an example computing device 600, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a programmable logic device (PLD), etc.) 602, a main memory 604 (e.g., synchronous dynamic random access memory (DRAM), read-only memory (ROM)), a static memory 606 (e.g., flash memory), and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of coil geometry module instructions 625, e.g., instructions for carrying out the operations described herein, in accordance with one or more aspects of the present disclosure. Coil geometry module instructions 625 may also reside, completely or at least partially, within main memory 604 and/or within processing device 602 during execution thereof by computing device 600, main memory 604 and processing device 602 also constituting computer-readable media. The coil geometry module instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Additional examples, implementations, embodiments, etc., are described in APPENDIX A, which is hereby incorporated by reference in its entirety.

Unless specifically stated otherwise, terms such as "obtaining," "generating," "analyzing," "determining," "performing," "reflecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

identifying a set of two or more basis functions from a plurality of basis functions, wherein each of the basis functions corresponds to pole numbers and pole directions that vary from other ones of the basis functions;

obtaining a set of input parameters to be used in conjunction with the set of basis functions;

performing an analysis of a set of coefficients of the set of basis functions based on the set of input parameters, including:

obtaining a summed matrix based on the set of basis functions; and obtaining an inverse discrete Fourier transform of the summed matrix to generate a scalar magnetic potential in a spatial domain; and generating one or more coil geometries based on the analysis of the set of coefficients of the set of basis functions and using the scalar magnetic potential, wherein a number of poles and directions of the poles in the generated one or more coil geometries are based on the identified set of basis functions and wherein the one or more coil geometries are incorporated into one or more of a transmitting coil and a receiving coil of a wireless power transfer system.

2. The method of claim 1, wherein the set of basis functions comprises Fourier basis functions.

3. The method of claim 2, wherein the Fourier basis functions comprises two dimensional sinusoidal functions.

4. The method of claim 1, wherein performing the analysis of the set of coefficients of the set of basis functions comprises:

obtaining a set of matrices based on the set of basis functions; and obtaining the summed matrix based on the set of matrices.

5. The method of claim 4, wherein obtaining the set of matrices based on the set of basis functions comprises:

obtaining portions of the set of matrices; and reflecting the portions of the set of matrices based on a set of symmetry conditions associated with the set of basis functions.

6. The method of claim 4, wherein the summed matrix indicates a magnetic potential of the one or more coil geometries in a Fourier domain.

7. The method of claim 1, wherein the one or more coil geometries are generated by discretizing the scalar magnetic potential into one or more winding contours based on equipotential contours corresponding to a desired number of coil turns.

8. The method of claim 4, wherein each matrix of the set of matrices is associated with a basis function of the set of basis functions.

9. The method of claim 1, wherein each basis function of the set of basis functions corresponds to a different type of coil geometry and is defined by spatial wavenumbers $k_x$ and $k_y$ in x and y directions.

10. The method of claim 1, wherein the set of input parameters indicate one or more of a stray field limit, an air gap, a power level, coil dimensions, and the set of basis functions.

11. The method of claim 1, wherein the one or more coil geometries are generated subject to one or more physical magnetic field constraints, the one or more physical magnetic field constraints including at least one of: a stray magnetic field limit, an air-gap magnetic field decay requirement, a power transfer requirement, a coil misalignment tolerance requirement, a current density limit, and a coil extent constraint.

12. An apparatus, comprising:

a memory configured to store data; and a processing device coupled to the memory, the processing device configured to:

identify a set of two or more basis functions from a plurality of basis functions, wherein each of the basis functions corresponds to pole numbers and pole directions that vary from other ones of the basis functions;

obtain a plurality of input parameters to be used in conjunction with the set of basis functions;

perform an analysis of a set of coefficients of the set of basis functions based on the plurality of input parameters, including:

obtaining a summed matrix based on the set of basis functions; and obtaining an inverse discrete Fourier transform of the summed matrix to generate a scalar magnetic potential in a spatial domain; and generate one or more coil geometries based on the analysis of the set of coefficients of the set of basis functions and using the scalar magnetic potential, wherein a number of poles and directions of the poles in the generated one or more coil geometries are based on the identified set of basis functions and wherein the one or more coil geometries are incorporated into one or more of a transmitting coil and a receiving coil of a wireless power transfer system.

13. The apparatus of claim 12, wherein the set of basis functions comprises Fourier basis functions.

14. The apparatus of claim 13, wherein the Fourier basis functions comprises two dimensional sinusoidal functions.

15. The apparatus of claim 12, wherein to perform the analysis of the set of coefficients of the set of basis functions the processing device is further configured to:

obtain a set of matrices based on the set of basis functions; and obtain a summed matrix based on the set of matrices.

16. The apparatus of claim 15, wherein to obtain the set of matrices based on the set of basis functions the processing device is further configured to:

obtain portions of the set of matrices; and reflect the portions of the set of matrices based on a set of symmetry conditions associated with the set of basis functions.

17. The apparatus of claim 15, wherein the summed matrix indicates a magnetic potential of the one or more coil geometries in a Fourier domain.

18. The apparatus of claim 12, further comprising discretizing the scalar magnetic potential into one or more winding contours based on equipotential contours corresponding to a desired number of coil turns.

19. A non-transitory computer readable medium having instruction stored thereon that, when executed by a processing device, cause the processing device to:

identify a set of two or more basis functions from a plurality of basis functions, wherein each of the basis functions corresponds to pole numbers and pole directions that vary from other ones of the basis functions;

obtain a set of input parameters to be used in conjunction with the set of basis functions;

perform an analysis of a set of coefficients of the set of basis functions based on the set of input parameters, including:

obtaining a summed matrix based on the set of basis functions; and obtaining an inverse discrete Fourier transform of the summed matrix to generate a scalar magnetic potential in a spatial domain; and generate one or more coil geometries based on the analysis of the set of coefficients of the set of basis functions and using the scalar magnetic potential, wherein a number of poles and directions of the poles in the generated one or more coil geometries are based on the identified set of basis functions and wherein the one or more coil geometries are incorporated into one or more of a transmitting coil and a receiving coil of a wireless power transfer system.

* * * * *